W. V. TURNER.
DEVICE FOR ELECTROPNEUMATIC BRAKES.
APPLICATION FILED OCT. 21, 1916.
1,294,975.
Patented Feb. 18, 1919.
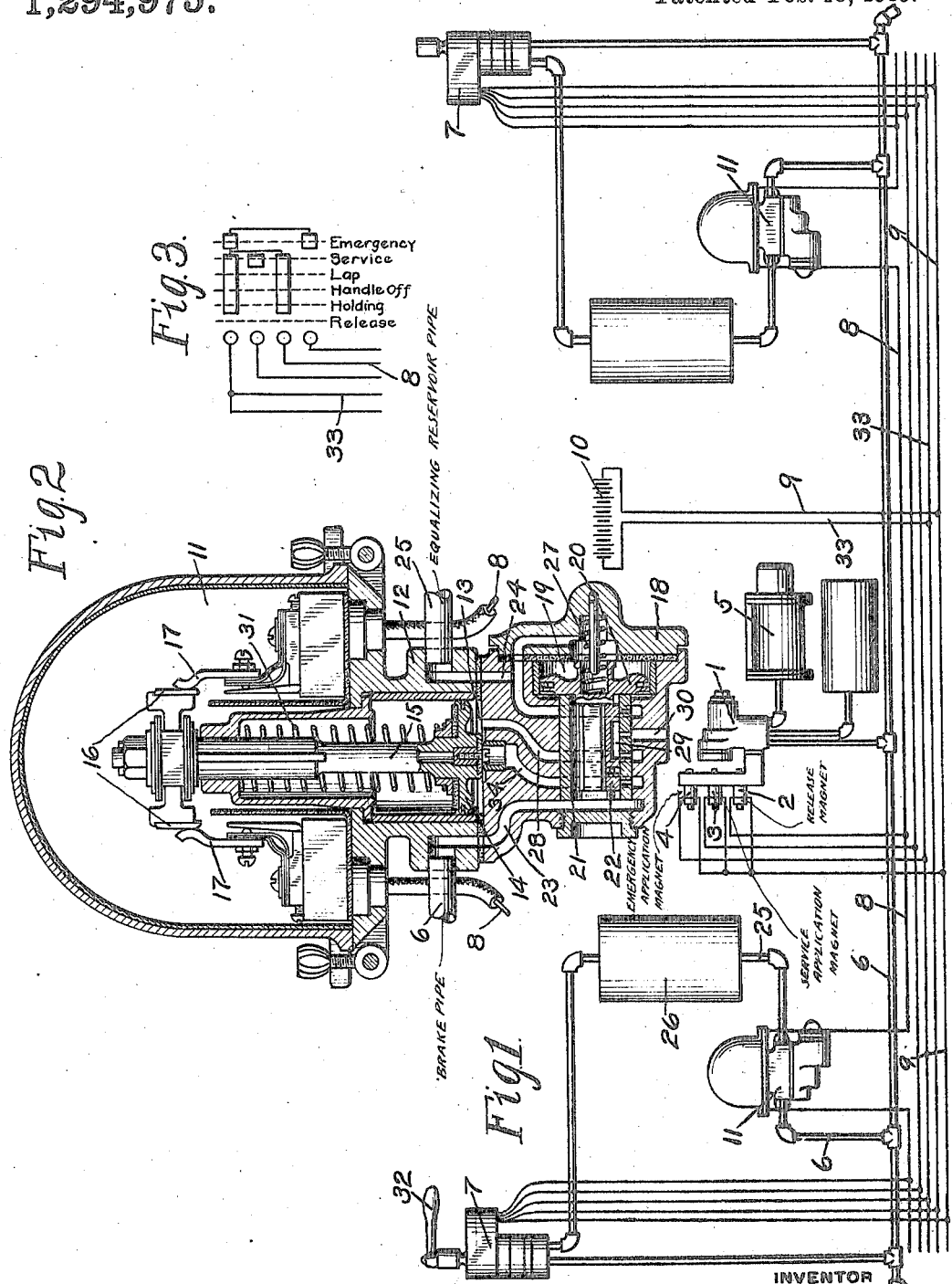

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

DEVICE FOR ELECTROPNEUMATIC BRAKES.

1,294,975.  Specification of Letters Patent.  Patented Feb. 18, 1919.

Application filed October 21, 1916. Serial No. 126,870.

*To all whom it may concern:*

Be it known that I, WALTER V. TURNER, a citizen of the United States, residing at Wilkinsburg, in the county of Allegheny and State of Pennsylvania, have invented new and useful Improvements in Devices for Electropneumatic Brakes, of which the following is a specification.

This invention relates to electro-pneumatic brakes, and more particularly to an equipment adapted to be controlled from opposite ends, otherwise known as a double end equipment.

With an equipment of the above type, when the operator changes ends, it is highly desirable that the brakes be left applied so as to prevent the car from running away, particularly where the car is on a grade.

In order to prevent the release of the brakes in changing ends, one object of my invention is to provide means for automatically closing the electrically controlled brake release when the operator shifts ends.

After the operator has changed ends, however, it is necessary to restore the electrical release of the brakes, so as to permit the release of the brakes and another object of my invention is to provide means for automatically accomplishing this result.

In the accompanying drawing, Figure 1 is a diagrammatic view of a double ended electro-pneumatic brake equipment embodying my invention; Fig. 2 a central sectional view of the automatic release control switch device; and Fig. 3 a diagram showing the brake switch contacts developed.

As shown in Fig. 1 of the drawing, the equipment may comprise a brake controlling valve device 1, similar to that covered by my prior Patent No. 1063623, dated June 3, 1913, and having a release magnet 2, a service application magnet 3, and an emergency application magnet 4 for electrically controlling the admission and release of fluid to and from the brake cylinder 5.

The controlling valve device 1 is connected by the usual automatic brake pipe 6 to a combined brake switch and brake valve device 7 located at each end of the car.

The release magnet 2 is adapted when energized to close and when deënergized to open the exhaust from the brake cylinder and has one terminal connected to a release train wire 8 and the other terminal to a battery return wire 9 leading to the negative terminal of a battery 10.

According to my invention, for controlling the release circuit automatically, a valve device 11 is provided at each end of the car, comprising a switch casing 12 having a piston chamber 13 containing a switch piston 14 for operating a piston stem 15 carrying switch contacts 16 adapted to engage stationary contact fingers 17 for controlling the circuit through the release wire 8. Secured to the switch casing 12 is a valve casing 18 having a piston chamber 19 containing a piston 20 and a valve chamber 21 containing a slide valve 22 and connected by passage 23 to the brake pipe 6.

Piston chamber 19 is connected by passage 24 and pipe 25 to the usual equalizing reservoir 26 of the brake valve, the pressure in which, as well understood, acts on one side of an equalizing discharge piston, the opposite side of the piston being subject to brake pipe pressure for controlling the discharge of fluid from the brake pipe in making an application of the brakes.

Normally, the brake pipe pressure is substantially equal to the pressure in the equalizing reservoir, so that the opposing pressures on piston 20 are equal and spring 27 maintains the piston 20 and slide valve 22 in the position shown in the drawing, in which a passage 28 leading to switch piston chamber 13 is connected by cavity 29 in the valve with an exhaust port 30.

The piston chamber 13 being thus at atmospheric pressure, the spring 31 acts on piston 14 to hold the switch contacts in closed position.

In operation, when the operator leaves one end of the car for the other, he makes an application of the brakes, if not already applied, so as to prevent the car from running away and consequently the brake pipe pressure stands reduced.

The operator then turns the brake valve handle 32 to the handle off position and removes same. In the handle off position, as shown in Fig. 3 of the drawing, the release wire 8 is connected to the positive battery wire 33, so that current is supplied to the release magnet 2, energizing same to close the brake cylinder exhaust.

Since in making a reduction in brake pipe pressure to apply the brakes, the equalizing reservoir pressure reduces at substantially the same rate as brake pipe pressure, the opposing fluid pressures on piston 20 reduce at the same rate, so that the piston is not moved from its normal position, and it will therefore be seen that since the brake cylinder exhaust is closed by the energization of the release magnet, the brakes will be held applied while the operator shifts from one end of the car to the other.

When the operator applies the brake valve handle at the opposite end of the car and turns the brake valve to running position, the brake pipe is recharged with fluid to the normal pressure. In handle off position, the equalizing reservoir is cut off from the brake pipe, so that while the brake pipe pressure is increased by the movement of the handle at the operating end, the equalizing reservoir pressure at the non-operating end remains at the reduced pressure.

The increased brake pipe pressure in valve chamber 21 then overcomes the reduced equalizing reservoir pressure in piston chamber 19 and the piston 20 thereupon shifts the valve so as to uncover a port 34, leading to the switch piston 14. Fluid under pressure from valve chamber 21 is then supplied to piston chamber 13 and the switch piston 14 is thereby operated to open the switch contacts. The release magnet 2 is thus deënergized and the release of the brakes is effected.

In the outer position of valve 21, cavity 29 connects exhaust port 30 to equalizing reservoir passage 24 through a restricted port, so that any leakage of fluid into the equalizing reservoir at the non-operating end will escape to the atmosphere and thus prevent possible building up of pressure in piston chamber 19, such as might cause movement of the piston to normal position.

By means of the above construction, the brakes are held applied when the operator removes the brake valve handle and goes to the opposite end of the car, and are automatically released when the handle is applied at the opposite end.

Having now described my invention, what I claim as new, and desire to secure by Letters Patent, is:—

1. In an electro-pneumatic brake, the combination with electrically controlled means for effecting the release of the brakes, of a manually operated switch device for controlling said means and adapted in handle off position to effect the operation of said means for preventing the release of the brakes.

2. In an electro-pneumatic brake, the combination with a valve for controlling the release of the brakes and an electro-magnet adapted upon energization for closing said valve, of a manually operated electric switch device for controlling said magnet and having a position in which the handle is removable and in which the magnet is energized.

3. In an electro-pneumatic brake, the combination with a brake cylinder and electrically operated means for controlling the exhaust of fluid from the brake cylinder, of a manually operated device at each end of the car for controlling said means and adapted in handle off position to operate said means for closing the brake cylinder exhaust and means for automatically opening said exhaust when the operating handle is applied at the opposite end of the car.

4. In an electro-pneumatic brake, the combination with a brake cylinder and electrically controlled means for controlling the exhaust of fluid from the brake cylinder, of a manually operated device at opposite ends of the car for controlling said means and adapted upon removal of the operating handle at one end of the car to effect the operation of said means for preventing the exhaust of fluid from the brake cylinder and a device operated upon applying the handle at the opposite end of the car for effecting the operation of said means to open the exhaust.

5. In an electro-pneumatic brake, the combination with electrically operated means for controlling the release of the brakes, of a brake pipe and a switch device operated upon an increase in brake pipe pressure for opening the electric circuit of said means.

6. In an electro-pneumatic brake, the combination with electrically operated means for controlling the release of the brakes, of a brake pipe normally containing fluid under pressure, means operated upon a reduction in brake pipe pressure for effecting an application of the brakes, and an electric switch device operated upon an increase in brake pipe pressure for opening the electric circuit of said electrically operated means.

7. In an electro-pneumatic brake, the combination with electrically operated means for controlling the release of the brakes, a brake pipe, a valve device operated upon a reduction in brake pipe pressure for effecting an application of the brakes, and a brake valve device having an equalizing reservoir, of a switch for controlling the electric circuit of said means and a valve device subject to the opposing pressures of the brake pipe and the equalizing reservoir for controlling said switch.

8. In an electro-pneumatic brake, the combination with electrically operated means for controlling the release of the brakes, a brake pipe, a valve device operated upon a reduction in brake pipe pressure for effecting an application of the brakes, and a brake valve device having an equalizing reservoir, of a switch for controlling the electric circuit of said means and a valve device subject to the opposing pressures of the brake pipe and the equalizing reservoir for controlling said switch and adapted upon an increase in brake pipe pressure to operate said switch for opening said circuit.

9. In an electro-pneumatic brake, the combination with a brake cylinder, an electro-magnet adapted upon energization to close the exhaust from the brake cylinder, a brake pipe, a valve device operated upon a reduction in brake pipe pressure for effecting an application of the brakes, and a combined brake switch and brake valve device having an equalizing reservoir and adapted in handle off position to energize the circuit of said electro-magnet, of an automatic switch mechanism subject to the opposing pressures of the brake pipe and equalizing reservoir and adapted to open said circuit upon movement of the brake valve device to a position for supplying fluid to the brake pipe.

In testimony whereof I have hereunto set my hand.

WALTER V. TURNER.